US005782550A

United States Patent [19]

Ohashi et al.

[11] Patent Number: 5,782,550

[45] Date of Patent: Jul. 21, 1998

[54] LAMP FOR AUTOMOBILE

[75] Inventors: Yasuhiro Ohashi; Hiroshi Shida, both of Shizuoka, Japan

[73] Assignee: Koito Manufacturing Co, Ltd., Tokyo, Japan

[21] Appl. No.: 665,899

[22] Filed: Jun. 19, 1996

[30] Foreign Application Priority Data

Jun. 21, 1995 [JP] Japan .................................... 7-178256

[51] Int. Cl.[6] ........................................................ B60Q 1/04

[52] U.S. Cl. ............................ 362/61; 362/255; 362/345; 362/351

[58] Field of Search ................................ 362/66, 80, 255, 362/351, 341, 345, 61, 297

[56] References Cited

U.S. PATENT DOCUMENTS

| | | | |
|---|---|---|---|
| 4,268,895 | 5/1981 | Yabata | 362/307 |
| 4,679,127 | 7/1987 | Ernst et al. | 362/294 |
| 5,111,368 | 5/1992 | Suzuki et al. | 362/61 |
| 5,195,815 | 3/1993 | Watanabe et al. | 362/61 |

FOREIGN PATENT DOCUMENTS

| | | | |
|---|---|---|---|
| 65722 | 11/1955 | France | 362/255 |
| 2601111 | 1/1988 | France | 362/282 |
| 1438253 | 6/1976 | United Kingdom | 362/255 |

*Primary Examiner*—Y. My Quach
*Attorney, Agent, or Firm*—Morgan, Lewis & Bockius LLP

[57] ABSTRACT

Structure is provided to protect a lamp body from the heat generated by a bulb without impairing the external appearance of a lamp or increasing the number of parts of the lamp. A lamp body incorporates a reflector, a bulb, and a shade for limiting the scope of light rays projected from the bulb. The shade has an upper shade portion and a lower shade portion which are integral with each other. The upper shade portion shields those of the light rays that would become dazzling light out of all of the light rays projected from the bulb. The lower shade portion shields those of the light rays from bulb projected toward a lower surface portion of the lamp body. The lower shade portion prevents direct projection of the light rays onto the lower surface portion of the lamp body by shielding the light rays from the bulb, which in turn prevents the lower surface portion of the lamp body from being overheated by the bulb. A part of the reflector extends over the lower surface portion of the lamp body, so that a problem of impairment in the external appearance of the lamp due to the lower surface portion of the lamp body being seen from outside is eliminated.

17 Claims, 6 Drawing Sheets

LAMP FOR AUTOMOBILE

BACKGROUND OF THE INVENTION

1. Field of the Invention

The present invention relates to an automobile lamp that can be downsized. More specifically, the present invention relates to a lamp, such as a fog lamp of an automobile, which has a reflector and a shade so that a predetermined light distributing characteristic can be obtained.

2. Discussion of the Related Art

A lamp having a high luminance bulb as a light source, such as a fog lamp of an automobile, requires that the lamp body be given some kind of protection against the heat generated by the light source. As an example, FIG. 7 shows a sectional structure of a conventional fog lamp. A lamp chamber is defined by attaching a lens 102 to the front opening of a lamp body 101 that is made of resin by molding. Inside the lamp chamber are a reflector 103, a bulb 104, and a shade 105 designed to provide a predetermined light distributing characteristic. The reflector 103 has a circumferential edge wall 106 formed so as to extend along the circumferential edge of the reflector to help prevent the inner surface of the lamp body 101 from being thermally damaged by the heat generated at the bulb 104. That is, the circumferential edge wall 106 also extends along the inner surface of the lamp body 101, and this circumferential edge wall 106 is used as a heat shielding plate with regard to the lamp body 101. Especially for lamps that are of the downsized, or reduced size, type, the distance between the bulb 104 and the lamp body 101 is short. This causes the lamp to be affected by the heat generated at the bulb. It is for this reason that heat shielding measures must be taken.

However, the reflector 103 must be designed so that the angle position thereof is adjustable with respect to the lamp body 101 so that the light distributing characteristic can be adjusted. Therefore, a space must be provided to allow the reflector to freely turn in the area between the reflector 103 and the lamp body 101. When such a space is provided in a lamp that is mounted on the lower side of an automobile with respect to the height of the eyes of an ordinary person, the space S between the front edge portion of the lower circumferential edge wall 106 of the reflector 103 and the lamp body 101 is exposed to the outside through the lens 102 of the lamp (i.e., it prevents light from traveling in certain directions in a way that is noticeable to observers). As a result, the space S is seen as being dark, which in turn impairs the external appearance of the lamp.

SUMMARY OF THE INVENTION

Accordingly, the present invention is directed to a lamp for an automobile that substantially obviates one or more of the problems due to limitations and disadvantages of the related art.

An object of the present invention is to provide a lamp for an automobile which can protect the lamp body against the heat generated at the bulb, without impairing the external appearance of the lamp.

To this end, the present invention generally relates to a lamp for an automobile, the lamp including: a lamp body; a bulb incorporated in the lamp body; a reflector for causing light to be projected from the lamp body by reflecting light from the bulb; and a shade for limiting the scope of distribution of the projected light by at least partially covering the bulb. In a lamp of this type, the shade has a first shade portion and a second shade portion integral with one another. The first shade portion shields the dazzling or brilliant component of the light projected from the bulb. The second shade portion shields the component of the light projected from the bulb which is directed toward a lower surface portion of the lamp body.

Preferably, the reflector has a lower circumferential edge wall portion, confronting the lower surface portion of the lamp body, which is notched to a position close to the back surface portion out of a circumferential edge wall that is continuous to the back surface portion serving as a reflecting mirror that reflects light from the bulb. Still further, it is preferred that the inner surface of at least the lower surface portion of the lamp body be subjected to such a reflecting process as to be substantially the same as that to which a surface of the reflector is subjected. In other words, these components should preferably have the same reflectance characteristics.

Direct projection of the light onto the lower surface portion of the lamp body is prevented by shielding the light from the bulb with the second shade portion of the shade, which in turn prevents the lower surface portion of the lamp body from being overheated by the bulb. As a result, it is not necessary to extend the circumferential edge wall of the reflector over the lower surface portion of the lamp body, and this contributes not only to improving the external appearance of the lamp when the lower surface portion of the lamp body is viewed from outside via the lens, but also to reducing the number of assembling steps.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the automobile lamp includes a lamp body; a bulb incorporated in the lamp body; a reflector for causing light to be projected from the lamp body by reflecting light projected from the bulb; and a shade, covering the bulb, for limiting a scope of distribution of the light projected by the bulb, the shade including a first shade portion and a second shade portion which are integral with one another, the first shade portion shielding a dazzling component of the light projected from the bulb, and the second shade portion shielding a component of the light projected by the bulb which is directed toward a lower surface portion of the lamp body.

In another aspect, the lamp for an automobile includes a lamp body; a bulb, incorporated in the lamp body, for projecting light; and a reflector, incorporated in the lamp body, for reflecting the light projected by the bulb toward a front portion of the lamp, the reflector including a back surface portion substantially behind the bulb; and a circumferential edge wall extending in a frontward direction along an inner surface of the lamp body at a circumferential edge of the back surface portion, the circumferential edge wall including a lower circumferential edge wall portion which confronts a lower surface portion of the lamp body and which is notched to a position adjacent to the back surface portion.

In a further aspect, the lamp for an automobile includes a lamp body; a bulb, incorporated in the lamp body, for projecting light; a reflector, incorporated in the lamp body, for reflecting the light projected by the bulb toward a front portion of the lamp; and a shade, incorporated in the lamp body and at least partially covering the bulb, for limiting a scope of distribution of the light projected by the bulb, the shade comprising a lower portion shielding a component of the light projected by the bulb which is directed toward a lower surface portion of the lamp body.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF PREFERRED EMBODIMENTS

Reference will now be made in detail to the preferred embodiments of the present invention, examples of which are illustrated in the accompanying drawings. Specifically, an embodiment of the invention will now be described with reference to FIG. 1 and others of the drawings.

Figure 1:
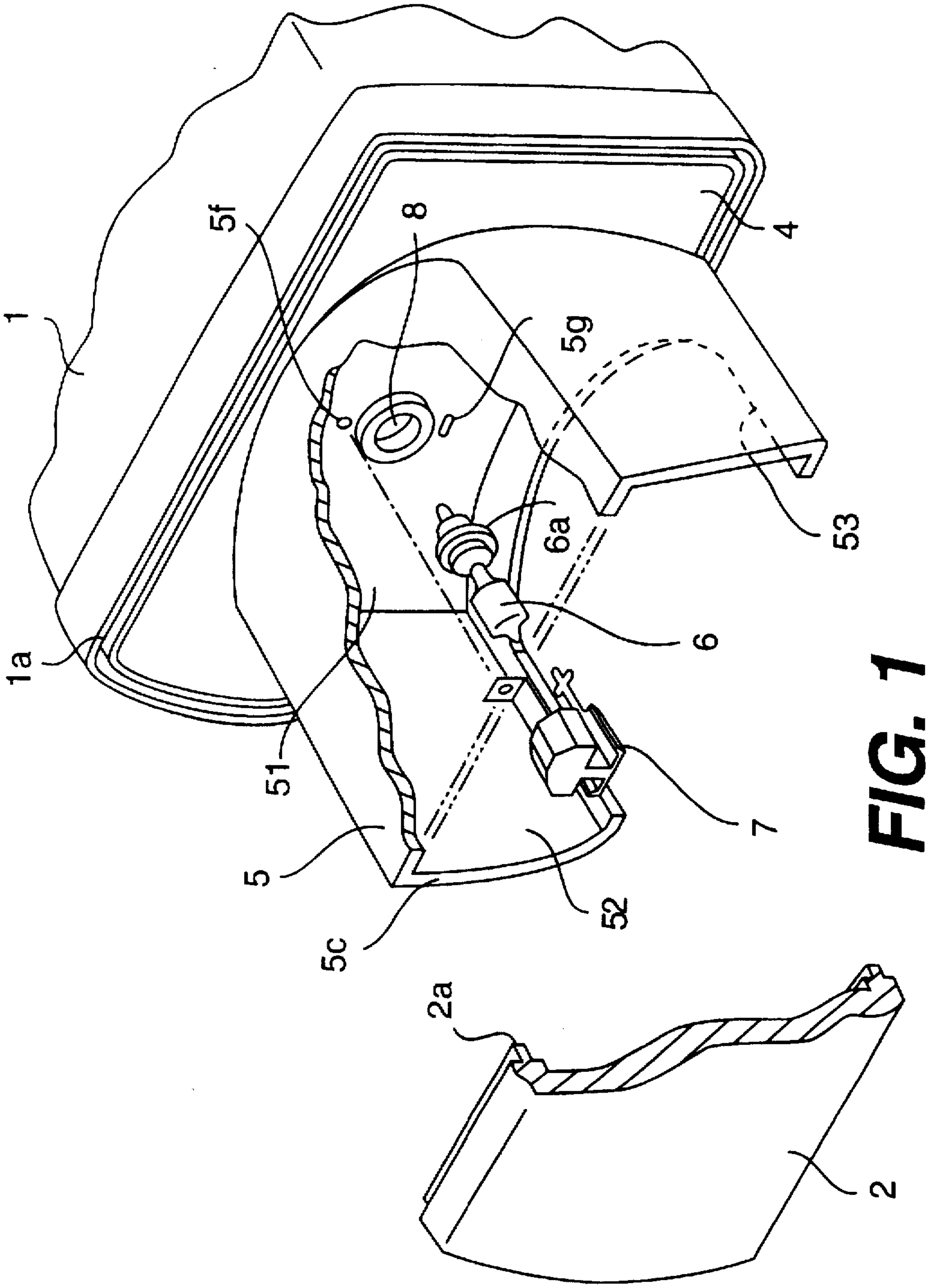
FIG. 1 is a partially exploded view of a lamp in accordance with an embodiment of the invention.
Figure 2:
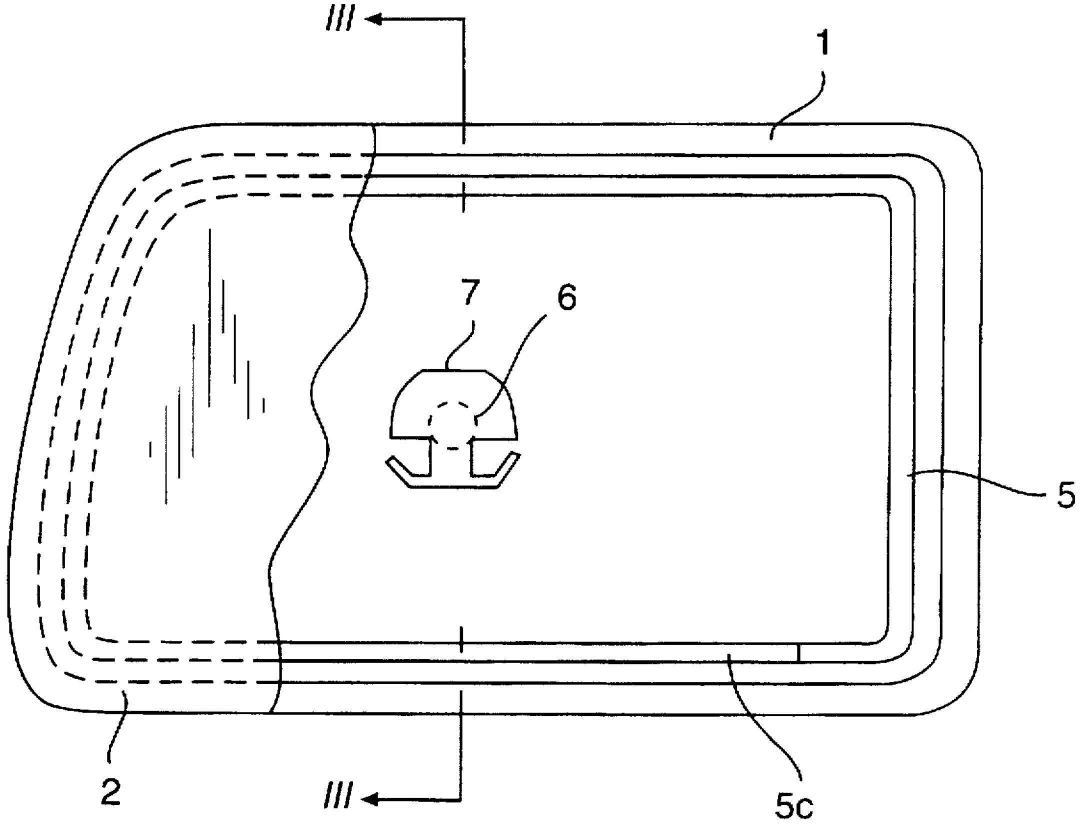
FIG. 2 is a partial cutaway front view of the lamp shown in FIG. 1.
Figure 3:
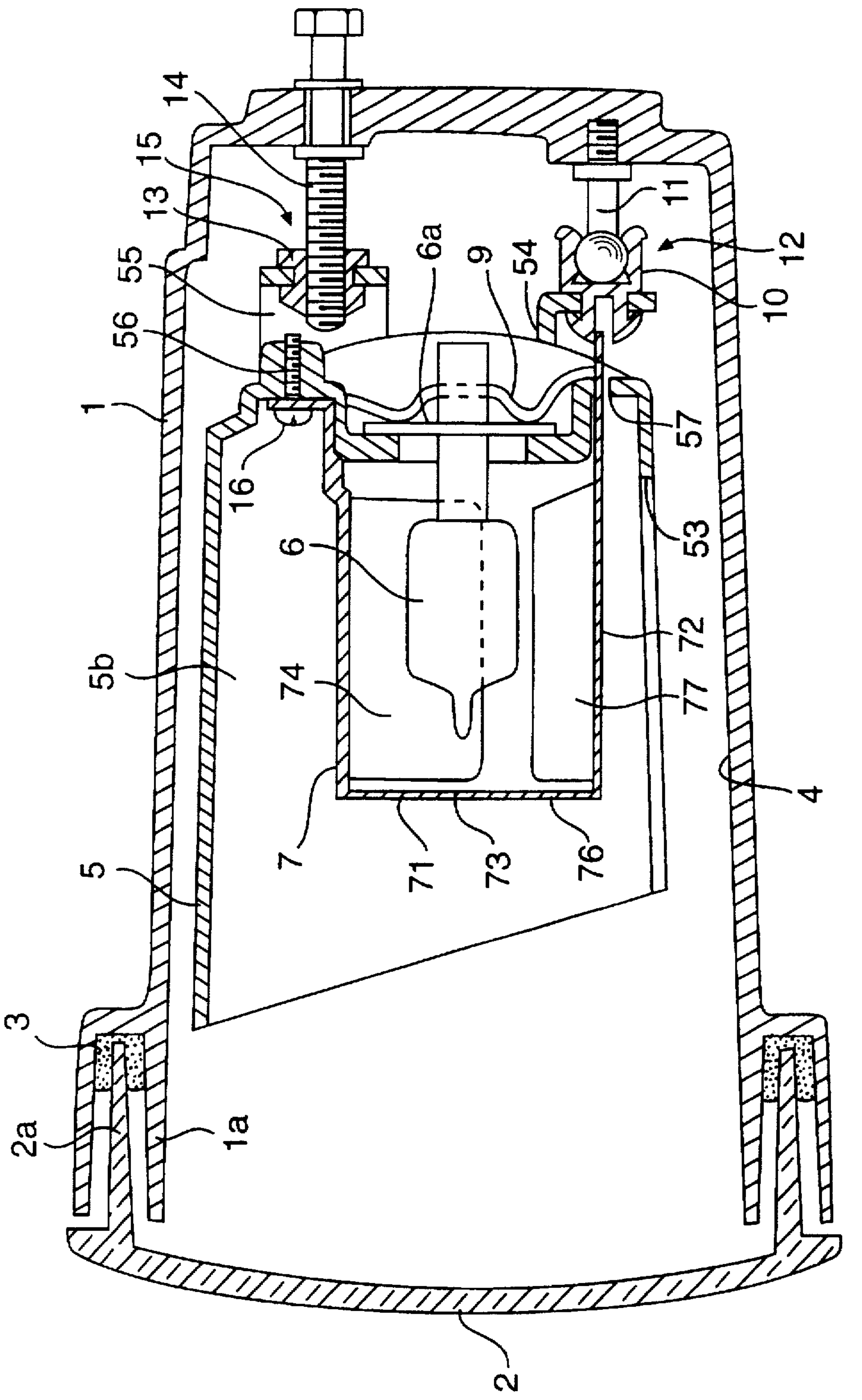
FIG. 3 is a sectional view of the lamp of the present invention taken along line III—III of FIG. 2.

FIG. 1 is a partially exploded perspective view of an embodiment in which the invention is applied to a fog lamp of an automobile; FIG. 2 is a partially cutaway front view of the embodiment shown in FIG. 1; and FIG. 3 is an enlarged sectional view taken along line III—III of FIG. 2.

With reference to these figures, a lamp body 1 made of resin by a molding process has a lens 2 attached to a front opening thereof to define a lamp chamber inside the lamp body by sealing seal leg portions 2*a* of the lens 2 along an opening peripheral edge groove 1*a* of the lamp body 1 with a seal agent 3. The seal leg portions 2*a* are arranged along the circumferential edge of the lens 2. The inner surface of the lamp body 1 defining the lamp chamber is plated or coated with metal such as aluminum, and the lower surface portion thereof in particular is subjected to a surface treatment 4 so that a reflecting surface similar to the reflecting surface of a reflector to be described later can be formed thereby. A reflector 5 is arranged within the lamp chamber. The reflector 5 has a bulb 6 that serves as a light source and a shade 7 that regulates light rays projected from the bulb 6. The reflector 5 includes a side portion 5*b* helping to define a reflector chamber, a peripheral portion 5*c*, an insertion hole 5*f*, and a slit hole 5*g*.

The reflector 5 has a back surface portion 51 formed into a parabolic mirror surface. A socket mounting hole 8 is arranged in the back surface portion 51 so that the bulb 6 can be inserted thereinto. A base 6*a* of the bulb 6 is attached to the socket mounting hole 8 by the pressure of a set spring 9. Further, the reflector 5 has a circumferential edge wall 52 that projects frontward along the peripheral edge of the back surface portion 51. The circumferential edge wall portions on the top and both sides in particular project all the way to the vicinity of the front opening of the lamp body 1, whereas the bottom circumferential wall portion has a notch 53 formed from the front edge thereof toward the back. Since the projecting dimension of the bottom circumferential edge wall portion is extremely short, the front edge of the bottom circumferential edge wall portion is formed so as to be positioned on the edge portion of the back surface portion 51.

Further, the reflector 5 is designed so that an optical axis thereof is adjustable. The reflector 5 is vertically turnable using a ball receiving portion 12 as a pivot. The ball receiving portion 12 is constructed of a ball receiving seat 10 and a ball pin shaft 11 as a pivot. The ball pin shaft 11 is fixed to the lamp body 1 and fitted into the ball receiving seat 10 attached to a bracket 54 that is part of the back surface portion 51. Further, a vertically aiming adjusting portion 15 is formed. A vertically aiming nut 13 is fixed to a bracket 55 on another part of the back surface portion 51 of the reflector above the ball receiving portion 12. The aiming nut 13 is screwed onto a vertically aiming adjusting screw 14 that is rotatably supported by the lamp body 1. Therefore, by rotating the vertically aiming adjusting screw 14, the position of vertically aiming nut 13 is changed, which in turn causes the reflector to turn vertically and therefore allows the position of the optical axis of the reflector 5 and the bulb 6 to be adjusted.

Figure 4:
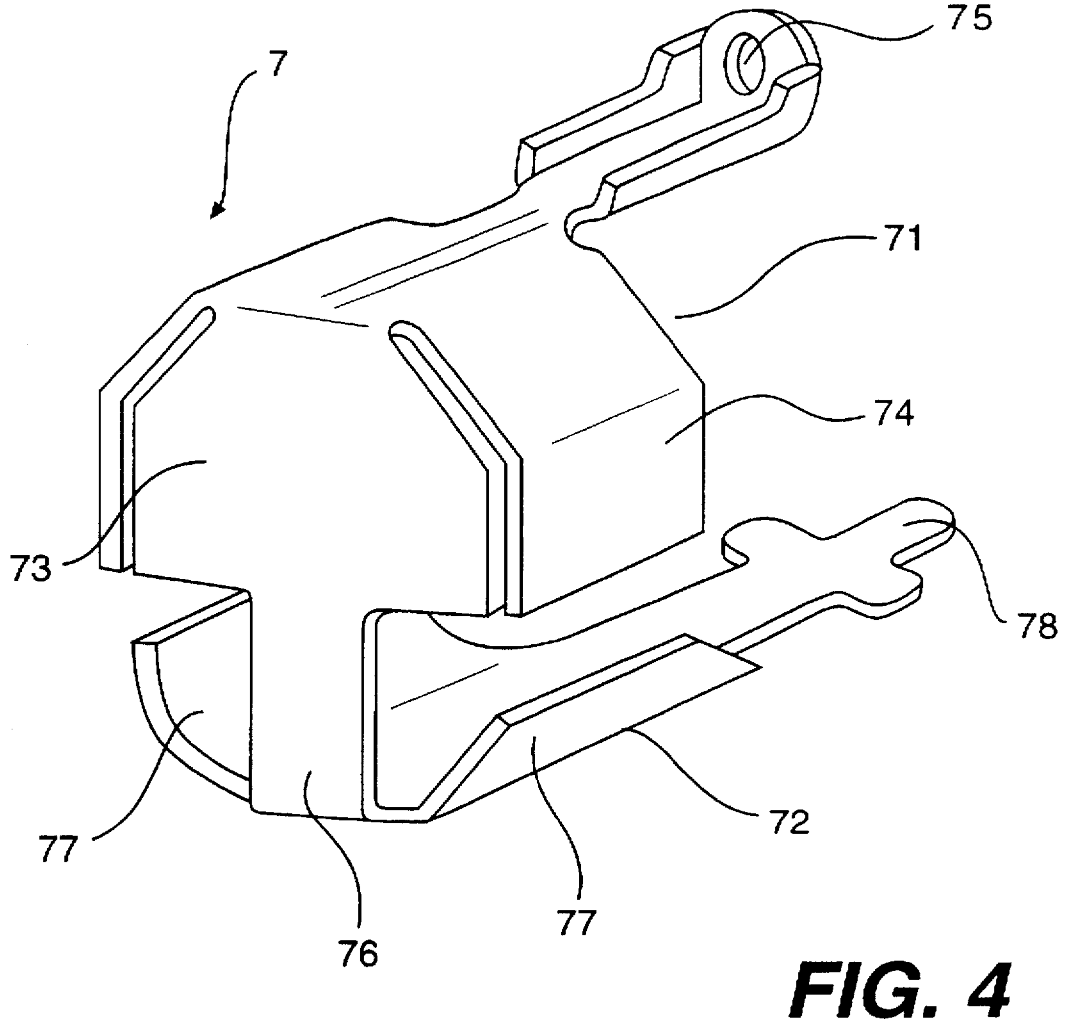
FIG. 4 is an enlarged perspective view of a shade such as that which can be used in connection with the present invention.

On the other hand, the shade 7 that is attached to the bulb 6 prevents the light rays from the bulb from being directly emitted upward through the lens 2. FIG. 4 is an enlarged perspective view of the shade 7.

Figure 5:
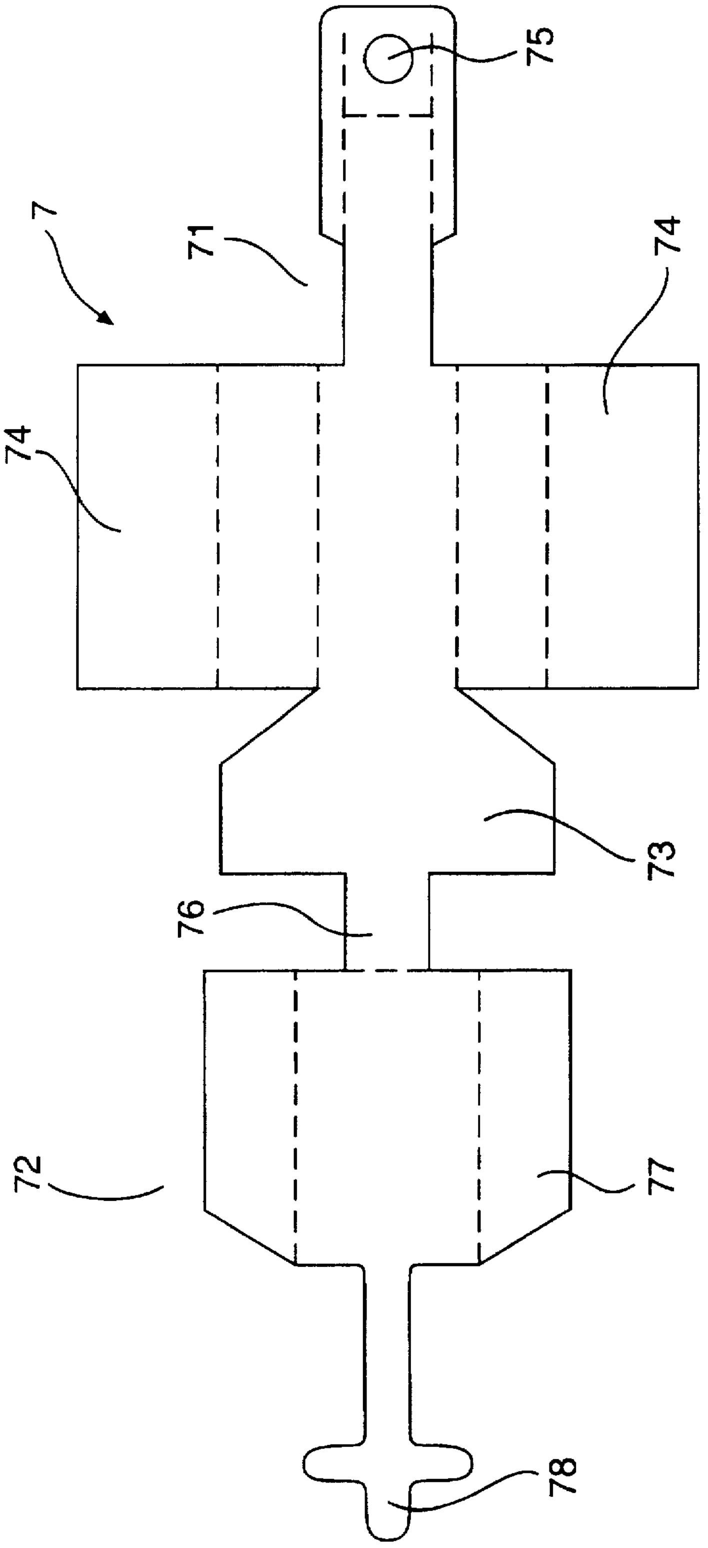
FIG. 5 is a development view relating to the shade shown in FIG. 4.

The shade 7 is formed by first blanking a heat-resistant material such as a metal plate as shown in FIG. 5 and then bending the blank. The shade 7 has an upper shade portion 71 and a lower shade portion 72. The upper shade portion 71 serves as a first shade portion to cover the upper portion of the bulb 6 and the lower shade portion 72 serves as a second shade portion that extends along the lower side of the bulb 6 when the shade 7 is attached to the reflector 5. The upper shade portion 71 includes a front or front surface portion 73 suspended in the front, a hood portion 74, and an insertion hole 75 that is formed at the base end of the upper shade portion. The hood portion 74 extends both leftward and rightward from the middle portion in a region close to the front so that substantially the upper half of the bulb 6 can be covered. Further, the lower shade portion 72 has a connecting portion 76, a bottom or bottom surface portion 77, and a retaining piece 78 formed integrally. The connecting portion 76 extends downward from the middle of the front portion 73. The bottom portion 77 is a saucer-like portion extending both leftward and rightward from the middle so as to extend along the lower side of the bulb 6. The bottom portion 77 also confronts the hood portion 74 while connected through the connecting portion 76. The retaining piece 78 is arranged at the base end of the lower shade portion 72.

A base end portion of the upper shade portion 71 is fixed to a screw hole 5*f* of the reflector back surface portion 51 with a screw 16 by taking advantage of the screw inserting hole 75 of the upper shade portion of the shade 7, and the retaining piece 78 arranged at a base end of the lower shade portion 72 is inserted into a slit hole 5*g* formed in the reflector back surface portion 51. As a result, the shade 7 is fixed to and supported by the reflector 5 at a predetermined position with respect to the bulb 6. By fixing the shade 7 to the reflector 5 at the respective base end portions of the upper and lower shade portions 71, 72, in particular, the shade 7 can be fixed to the reflector 5 in a stable fashion against vibrations and shocks to which the automobile is subjected.

Therefore, when the shade 7 is fixed to and supported by the reflector 5, the light from the bulb 6 will not be projected toward the front surface, the upper surface, and both side surfaces of the bulb 6 because the upper shade portion 71 covers the front subrace, the upper surface, and both side surfaces of the bulb 6 from above with the front surface portion 73 and hood portion 74 thereof. Nor will the light from the bulb 6 be projected downward because the lower shade portion 73 covers the lower side surface of the bulb 6 with the bottom surface portion 77 thereof. What is important is that the bottom surface portion 77 of the lower shade portion 72 extends along the lower side of the bulb 6. That is, the bottom surface portion 77 may have a plate-like shape.

Figure 6:
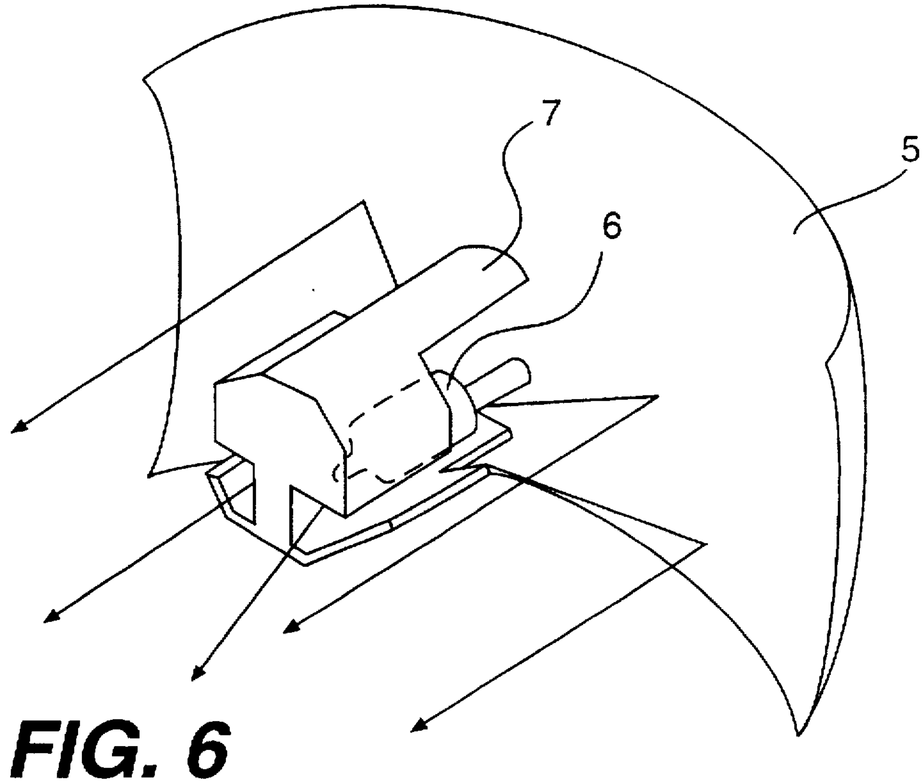
FIG. 6 is a schematic perspective view illustrating a shielding operation of the shade for use in the present invention.
Figure 7:
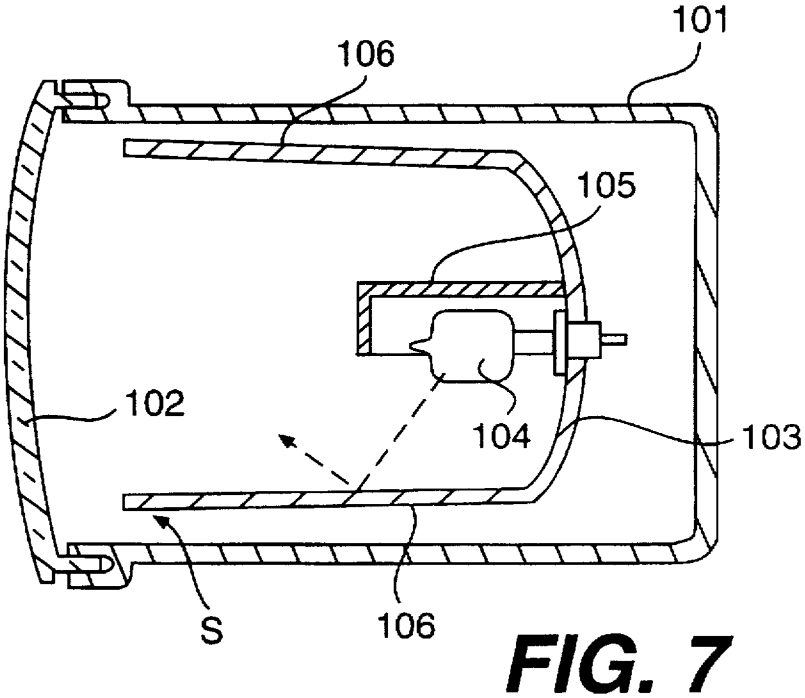
FIG. 7 (PRIOR ART)
FIG. 7 is a sectional view of an exemplary conventional lamp.

By using the shade 7 constructed in this manner, light rays projected frontward in upward directions, light rays projected upward, and light rays projected leftward and rightward as well as upward in such leftward and rightward directions, out of the total light rays projected from the bulb 6, are shielded by the front surface portion 73 and the hood portion 74 of the upper shade portion 71 as shown by schematic diagram in FIG. 6. Further, light rays projected frontward in downward directions out of the light rays projected from the bulb 6 pass through a space on both sides of the connecting portion 76 and are then projected onto the lower portion in the front of the automobile via the lens 2. Still further, light rays projected rearward and light rays projected leftward and rightward out of the light rays projected from the bulb 6 are irradiated onto the reflector 5, reflected by the reflector 5, and thereafter projected toward the front of the automobile via the lens 2.

As a result, no light rays are projected the front of the lamp in upward directions directly via the lens 2 out of all of the light rays projected from the bulb 6, which in turn allows the light rays to be projected in the front of the automobile. Hence, a predetermined anti-dazzling light distributing characteristic required for automotive lamps can be obtained. Since the light rays projected upward are also shielded at the same time, overheating of the upper surface portion of the lamp body 1 can be suppressed. The upper surface portion of the lamp body 1 is thermally shielded by the upper circumferential edge wall portion of the reflector 5. As a result, the air within the lamp chamber heated by the bulb 6 is radiated and circulated, so that the upper surface portion of the lamp body 1 can be made less affected by heat in particular.

On the other hand, light rays irradiated immediately below out of all the light rays projected from the bulb 6 are shielded by the bottom surface portion 77 of the lower shade portion 72, which in turn prevents the light rays from being directly irradiated onto the lower surface portion of the lamp body 1. Therefore, even if the lower circumferential edge wall portion of the reflector 5 is cut out to thereby provide the notch 53 with no circumferential wall portion being present in this region, the light rays will not projected directly onto the lower surface portion of the lamp body 1. As a result, the overheating of the lower surface portion can be prevented, which in turn contributes to preventing the lamp body from being damaged by heat.

Therefore, the overheating of the lower surface portion of the lamp body 1 is prevented, and the damaging of the lamp body due to heat can also be prevented, by assembling the lamp in exactly the same manner as that employed for the conventional lamp having a reflector and a shade. As a result, it is not necessary to extend the front edge of the lower circumferential edge wall of the reflector 5 to a position close to the front opening of the lamp body 1 as a heat shielding plate. Therefore, impairment in the external appearance of the lamp due to a space being present between the reflector 5 and the lamp body 1 can be prevented. Further, in this case, even if the lower circumferential edge wall portion of the reflector 5 is notched as far as to the back surface side to expose the inner surface of the lower surface portion of the lamp body 1 in that region, the boundary between the reflector 5 and the lamp body 1 is unlikely to be exposed from the outside of the lamp because a reflecting treatment 4 similar to that of the reflector is provided on the inner surface of the lower surface portion of the lamp body 1. Therefore, there should be no problem of impaired external appearance of the lamp in this respect, either. Still further, it is not necessary to arrange a heat shielding plate above the lower side of the lamp body as a separate member, which in turn reduces the number of parts and the number of mounting steps.

While the shade has the upper shade portion connected to the lower shade portion through the connecting portion arranged in the front hereof, two connecting portions may be arranged on both sides of the front of the shade if it is important to distribute light frontward in downward directions. Further, while the lower support piece is arranged in order to hold the shade stable against the vibrations and shocks to which the automobile is subjected in the aforementioned embodiment, the lower support piece may be omitted if the upper support piece alone can provide sufficient support.

Furthermore, while the example in which the invention is applied to a fog lamp has been described in the aforementioned embodiment, the invention may similarly be applied to any lamp for which downsizing is to be achieved, particularly if the lamp has a reflector and a shade and a lamp body which must be protected against heat from the bulb.

As described in the foregoing, the invention is characterized as constructing the shade of the first shade portion for shielding dazzling light rays out of all of the light rays projected from the bulb and as constructing the second shade portion for shielding light rays projected toward the lower surface portion of the lamp body so as to be integral to each other, the shade serving to limit the scope of distribution of the light projected from the bulb that is incorporated in the lamp body. Therefore, direct projection of the light rays from the bulb onto the lower surface portion of the lamp body can be prevented by the second shade portion, which in turn prevents the lower surface portion of the lamp body from being overheated by the bulb. As a result, it is not necessary to extend the circumferential edge wall of the reflector over the lower surface portion of the lamp body, which in turn contributes to improving the external appearance of the lamp when the lower surface portion of the lamp body is viewed from outside the lamp via the lens.

Further, the reflector incorporated in the lamp body has a lower circumferential edge wall portion which confronts the lower surface portion of the lamp body out of the circumferential edge wall continuous to the back surface portion serving as the reflecting mirror that reflects light projected from the bulb, and which is notched to a position close to the back surface portion. Therefore, the front edge of the circumferential edge wall of the reflector will not extend to a position close to the front opening, which in turn prevents the space between the front edge of the circumferential edge wall and the lower surface portion of the lamp body from being seen as dark from outside. As a result, the external appearance of the lamp can be improved.

Still further, the inner surface of at least the lower surface portion of the lamp body is subjected to a reflecting treatment such as to provide the inner surface with substantially the same reflecting characteristic as that of the reflector surface. Therefore, even if the lower circumferential edge wall portion of the reflector is notched, the notched edge portion of the reflector is not easy to see because the inner surface of the lower surface portion of the lamp body that is exposed in this notched portion exhibits the same external appearance as that of the reflector. As a result, the external appearance of the lamp can be improved.

It will be apparent to those skilled in the art that various modifications and variations can be made in the automobile lamp of the present invention without departing from the spirit or scope of the invention. Thus, it is intended that the present invention cover the modifications and variations of this invention provided that the modification and variation come within the scope of the appended claims and their equivalents.

What is claimed is:

1. A lamp for an automobile, the lamp comprising:

a lamp body;

a bulb disposed in the lamp body;

a reflector for reflecting light projected from the bulb toward a frontward direction, the reflector including a back surface portion and a circumferential edge wall, wherein the back surface portion serves as a reflecting mirror to reflect the light projected from the bulb, and wherein the circumferential edge wall extends in the frontward direction along an inner surface of the lamp body from a circumferential edge of the back surface portion; and a lower circumferential edge wall portion which confronts a lower surface portion of the lamp body and which is notched to a position in close proximity to the back surface portion; and a shade, covering the bulb, for limiting a scope of distribution of the light projected by the bulb, the shade including a first shade portion and a second shade portion, the first shade portion shielding a dazzling component of the light projected from the bulb, and the second shade portion shielding a component of the light projected by the bulb which is directed toward the lower surface portion of the lamp body.

2. The lamp for an automobile according to claim 1, wherein an inner surface of at least the lower surface portion of the lamp body includes a reflective surface.

3. The lamp for an automobile according to claim 2, wherein the reflector and the reflective surface of the lamp body have substantially identical reflectance characteristics.

4. The lamp for an automobile according to claim 1, wherein the first shade portion and the second shade portion are integral.

5. A lamp for an automobile, the lamp comprising:

a lamp body;

a bulb, disposed in the lamp body, for projecting light; and a reflector, disposed in the lamp body, for reflecting the light projected by the bulb toward a front portion of the lamp, the reflector including:

a back surface portion substantially behind the bulb; and a circumferential edge wall extending in a frontward direction along an inner surface of the lamp body from a circumferential edge of the back surface portion, the circumferential edge wall including a lower circumferential edge wall portion which confronts a lower surface portion of the lamp body and which is notched to a position adjacent to the back surface portion.

6. The lamp for an automobile according to claim 4, wherein the lamp body comprises a reflective surface located below a position where the lower circumferential edge wall portion is notched.

7. The lamp for an automobile according to claim 6, wherein the reflector and the reflective surface of the lamp body have substantially identical reflectance characteristics.

8. The lamp for an automobile according to claim 5, further comprising a shade, disposed in the reflector and partially covering the bulb, for limiting a scope of distribution of the light projected by the bulb.

9. The lamp for an automobile according to claim 8, wherein the shade comprises a lower portion shielding a component of the light projected by the bulb which is directed toward the lower surface portion of the lamp body.

10. The lamp for an automobile according to claim 9, wherein the lower portion of the shade extends along a lower side of the bulb.

11. The lamp for an automobile according to claim 10, wherein the shade further comprises an upper portion, integral with the lower portion, for shielding a dazzling component of the light projected from the bulb.

12. The lamp for an automobile according to claim 11, wherein the upper and lower portions of the shade are coupled to one another by a connecting portion of the shade located between the bulb and the front portion of the lamp.

13. The lamp for an automobile according to claim 12, wherein the lamp is configured such that light projected from a lens at the front portion of the lamp includes a first light component made up of light rays projected directly by the bulb through spaces located on either side of the connecting portion of the shade, and a second light component made up of light rays projected from side and back portions of the bulb and thereafter reflected by the reflector.

14. A lamp for an automobile, the lamp comprising:

a lamp body;

a bulb, disposed in the lamp body, for projecting light;

a reflector, disposed in the lamp body, for reflecting the light projected by the bulb toward a front portion of the lamp; and a shade, disposed in the lamp body and at least partially covering the bulb, for limiting a scope of distribution of the light projected by the bulb, the shade including a lower shade portion which shields a component of the light projected by the bulb toward a lower surface portion of the lamp body, a front shade portion which shields a dazzling component of the light projected from the bulb, and a connecting portion which integrally connects the lower shade portion and the front shade portion, wherein spaces are defined on both sides of the connecting portion to pass light projected by the bulb, wherein the lower shade portion extends along a lower side of the bulb, and wherein the lamp is configured such that light projected from a lens at the front portion of the lamp includes a first light component made up of light rays projected directly by the bulb through the spaces and a second light component made up of light rays projected from side and back portions of the bulb and thereafter reflected by the reflector.

15. A lamp for an automobile, the lamp comprising:

a lamp body;

a bulb, disposed in the lamp body, for projecting light;

a reflector, disposed in the lamp body, for reflecting the light projected by the bulb toward a front portion of the lamp, the reflector including:

a back surface portion substantially behind the bulb, and a circumferential edge wall extending in a frontward direction along an inner surface of the lamp body from a circumferential edge of the back surface portion, the circumferential edge wall including a lower circumferential edge wall portion which confronts a lower surface portion of the lamp body and which is notched to a position adjacent the back surface portion; and a shade, disposed in the lamp body and at least partially covering the bulb, for limiting a scope of distribution of the light projected by the bulb, the shade including a lower shade portion which shields a component of the light projected by the bulb toward the lower surface portion of the lamp body, a front shade portion which shields a dazzling component of the light projected from the bulb, and a connecting portion which connects the lower shade portion and the front shade portion, wherein spaces are defined on both sides of the connecting portion to pass light projected by the bulb.

16. The lamp for an automobile according to claim 15, wherein the lamp body comprises a reflective surface located below a position where the lower circumferential edge wall portion is notched.

17. The lamp for an automobile according to claim 16, wherein the reflector and the reflective surface of the lamp body have substantially identical reflectance characteristics.

* * * * *

UNITED STATES PATENT AND TRADEMARK OFFICE

CERTIFICATE OF CORRECTION

PATENT NO. : 5,782,550

DATED : July 21, 1998

INVENTOR(S) : OHASHI et al.

It is certified that error appears in the above-identified patent and that said Letters Patent is hereby corrected as shown below:

Column 8, Line 14, change "claim 4" to --claim 5--.

Signed and Sealed this

Thirtieth Day of March, 1999

*Attest:*

Q. TODD DICKINSON

*Attesting Officer*

*Acting Commissioner of Patents and Trademarks*